United States Patent
Davi et al.

(10) Patent No.: US 9,267,691 B2
(45) Date of Patent: Feb. 23, 2016

(54) QUICK DISCONNECT COMBUSTION ENDCOVER

(75) Inventors: Michael Alan Davi, Niskayuna, NY (US); Rahul Jaikaran Chillar, Atlanta, GA (US); Stephen Hugh Black, Duanesburg, NY (US); John William Herbold, Fountain Inn, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1029 days.

(21) Appl. No.: 13/342,629

(22) Filed: Jan. 3, 2012

(65) Prior Publication Data

US 2013/0167537 A1 Jul. 4, 2013

(51) Int. Cl.
*F23R 3/60* (2006.01)
*F16B 2/06* (2006.01)

(52) U.S. Cl.
CPC ... *F23R 3/60* (2013.01); *F16B 2/06* (2013.01); *Y10T 24/44017* (2015.01)

(58) Field of Classification Search
USPC .............. 60/734, 752–760, 796, 805
See application file for complete search history.

(56) References Cited

U.S. PATENT DOCUMENTS

| | | | | |
|---|---|---|---|---|
| 3,742,704 | A | * | 7/1973 | Adelizzi et al. ............. 60/796 |
| 3,965,066 | A | * | 6/1976 | Sterman et al. ............. 60/800 |
| 4,716,721 | A | * | 1/1988 | Pask et al. ................ 60/796 |
| 6,089,025 | A | | 7/2000 | Tekriwal et al. |
| 6,112,971 | A | | 9/2000 | Castaldo et al. |
| 6,189,313 | B1 | * | 2/2001 | Cass et al. ................ 60/796 |
| 6,823,676 | B2 | * | 11/2004 | Conete et al. .............. 60/796 |
| 7,134,287 | B2 | | 11/2006 | Belsom et al. |
| 7,377,116 | B2 | | 5/2008 | Parker et al. |
| 7,788,932 | B2 | | 9/2010 | Kunitake et al. |
| 2003/0014964 | A1 | * | 1/2003 | Sathianathan et al. ........ 60/226.1 |
| 2010/0000227 | A1 | * | 1/2010 | Porte et al. ............... 60/796 |
| 2012/0023968 | A1 | * | 2/2012 | Shteyman et al. ............ 60/796 |

* cited by examiner

*Primary Examiner* — Arun Goyal
(74) *Attorney, Agent, or Firm* — Nixon & Vanderhye, P.C.

(57) ABSTRACT

A clamp assembly for facilitating attachment and removal of a first component to or from a second component includes plural clamp bodies, each having at least two mutually perpendicular surfaces arranged about the first component. A substantially rigid ring is located between one surface of the clamp body and a surface of the first component. At least one fastener is provided for each of the plural clamp bodies, adapted to extend through a respective one of the plural clamp bodies and into the second component. Tooling is provided to allow for simultaneous tightening or loosening of all bolts on a single combustor.

20 Claims, 4 Drawing Sheets

QUICK DISCONNECT COMBUSTION ENDCOVER

BACKGROUND OF THE INVENTION

This invention relates generally to gas turbine combustor technology and, more specifically, to a quick disconnect combustor endcover or casing assembly.

In certain land-based power generation gas turbine engines, plural combustors are arranged in an annular array about the turbine rotor to provide for the combustion of fuel and to guide the energized combustion products into the turbine section to drive the turbine. Each combustor typically includes an outer casing which defines the external boundary of the combustor, a flow sleeve for distributing compressor discharge air to the head end of the combustor while cooling a liner which encloses the combustion process, and a transition piece for flowing the combustion products into the turbine section. The combustor also includes a plurality of fuel nozzles coupled to an endcover at the head end of the combustor. Air and fuel are supplied through the endcover to the fuel nozzles for combustion within the liner.

Current technology utilizes conventional multi-bolt, metallic flange-on-flange connections for attaching endcovers to turbine casings. Since the combustor is one of most frequently-inspected and replaced gas turbine components, improving access to the combustor internals, via the endcover, would be a key step toward minimizing outage durations and maximizing turbine availability. Accordingly, there remains a need for a combustor endcover or casing that is easily removed and reinstalled to shorten service outage duration while retaining sealing requirements with the combustor.

BRIEF SUMMARY OF THE INVENTION

In accordance with an exemplary but nonlimiting embodiment, the invention provides a clamp assembly for facilitating attachment and removal of a first component to or from a second component comprising plural clamp bodies, each having at least two mutually perpendicular surfaces arranged about the first component; a substantially rigid ring located between one surface of the clamp body and a surface of the first component; and at least one fastener for each of the plural clamp bodies adapted to extend through a respective one of the plural clamp bodies and into the second component.

In another aspect, the invention provides an assembly comprising a combustor casing and an endcover attached to a compressor discharge casing; plural clamp bodies, each having at least two mutually perpendicular surfaces arranged about the endcover or combustor casing; a substantially rigid stiffener ring located between one surface of the clamp body and a surface of the endcover or combustor casing; and at least one fastener for each of the plural clamp bodies adapted to extend through a respective one of the plural clamp bodies and into the casing.

In still another aspect, the invention provides a combustor casing assembly comprising a combustor casing and an endcover attached to a forward end of a compressor discharge casing; plural clamp bodies, each having at least two mutually perpendicular surfaces arranged about the combustor casing; a substantially rigid stiffener ring located between one surface of the clamp body and a surface of the combustor casing; at least one fastener for each of the plural clamp bodies adapted to extend through a respective one of the plural clamp bodies and into the compressor discharge casing; and tooling for simultaneously tightening or loosening the at least one fastener of each of the plural clamp bodies.

The invention will now be described in detail in connection with the drawings identified below.

DETAILED DESCRIPTION OF THE INVENTION

Figure 1:
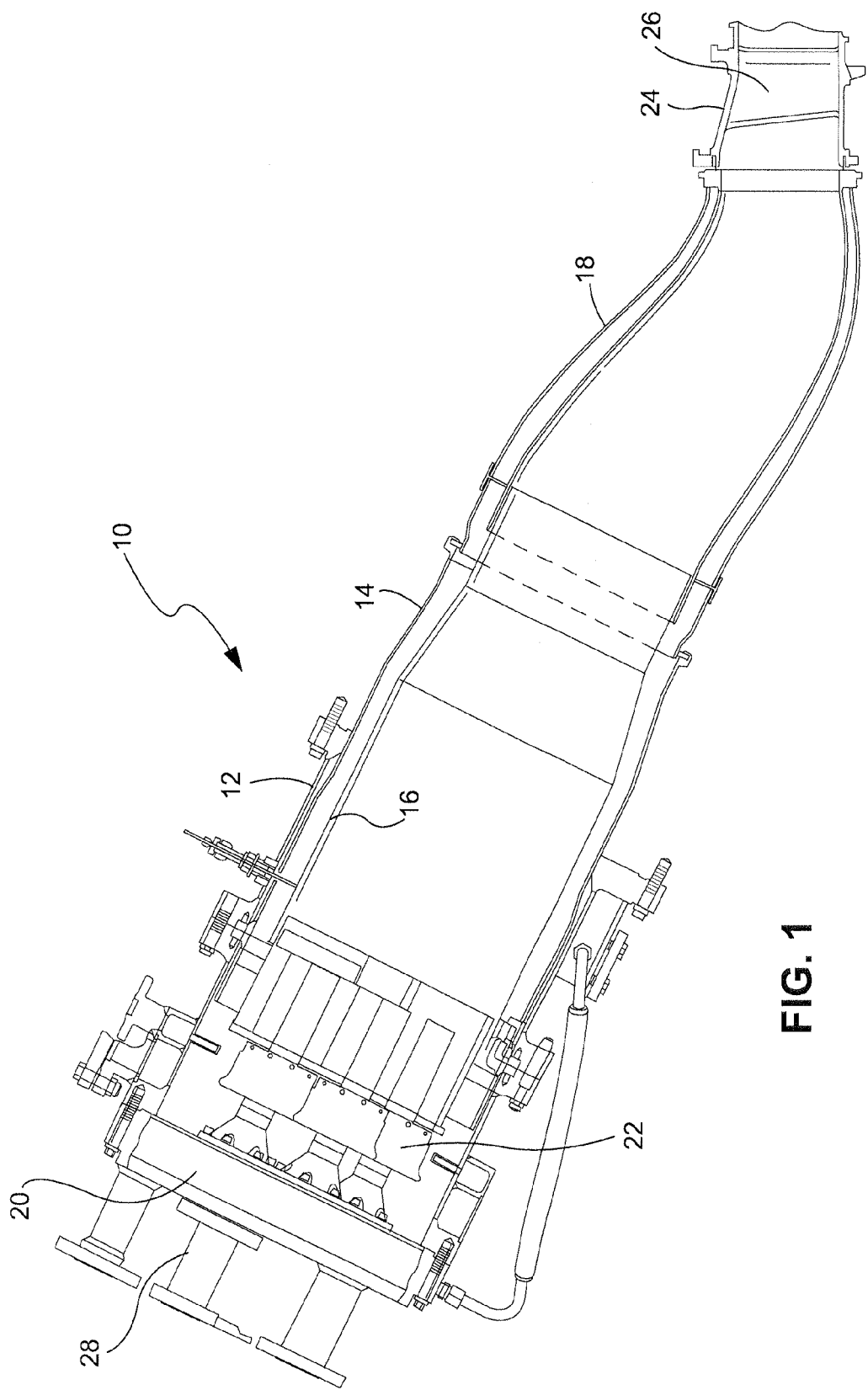
FIG. 1 is a schematic illustration of a combustor for gas turbine.

FIG. 1 illustrates a combustor employing an endcover assembly in accordance with conventional practice. The combustor, generally designated 10, includes an outer casing 12, a flow sleeve 14, a liner 16, a transition piece 18, an endcover 20 and a plurality of fuel nozzles 22. In typical gas turbine combustors of this type, the flow sleeve 14 distributes compressor discharge air into the combustor while cooling the liner 16. The endcover 20 encloses the head end of the combustor, supplies purge air and fuel to the fuel nozzles 22, and forces air into the head end of the liner by way of the fuel nozzle bodies. The liner 16 provides an enclosure for the combustion process, while the transition piece 18 guides the products of combustion into the turbine section 24, the first stage stator vane of which is illustrated at 26. External plumbing 28 connects to the endcover assembly 20 for supplying air and fuel to the nozzles 22.

Figure 2:
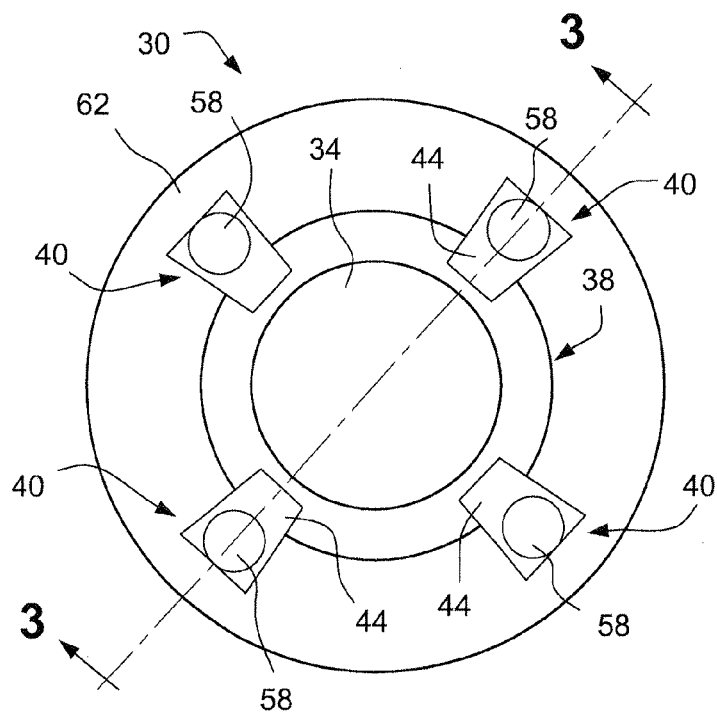
FIG. 2 is a schematic end view of a combustor endcover in accordance with a first exemplary but nonlimiting embodiment of the invention.
Figure 3:
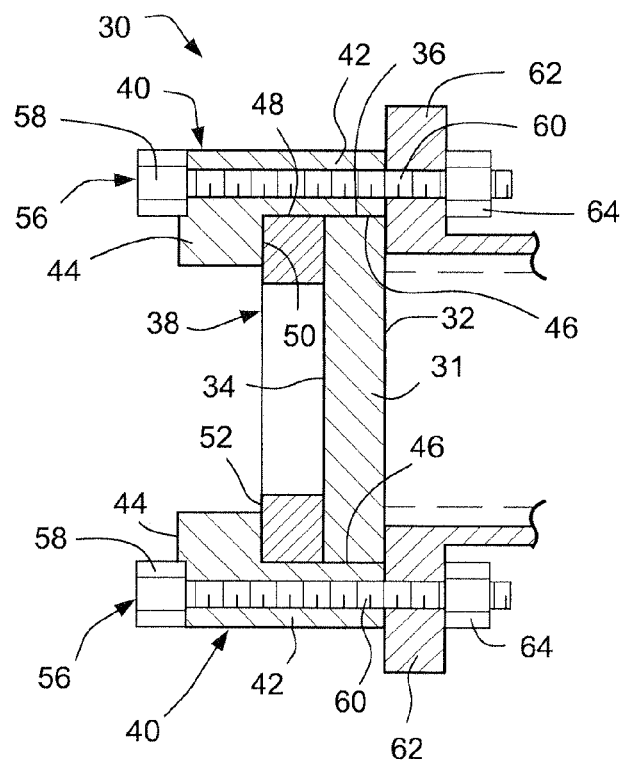
FIG. 3 is a side elevation view of the endcover shown in FIG. 2.

FIGS. 2 and 3 illustrate an exemplary but nonlimiting embodiment of an endcover assembly 30 which, for clarity and ease of understanding, is shown to include an endcover 31 having a round shape including flat inside and outside surfaces 32, 34 respectively and a peripheral edge 36. Fuel nozzles and other plumbing components have been omitted.

During assembly of the endcover to the combustor, stiffener ring 38 is applied over the outside surface 34 of the endcover 31, noting that the outside diameter of the stiffener ring is substantially equal to the outside diameter of the endcover.

A plurality of clamps 40 are located about the stiffener ring circumference, each clamp having an axial section 42 and a radially-inwardly directed flange 44. An inside surface 46 of the axial section 42 engages the peripheral edge 36 of the endcover and the adjacent peripheral edge 48 of the stiffener ring. At the same time, an interior flange surface 50 of the inwardly-directed radial flange 44 engages the outer surface 52 of the stiffener ring. While the clamps are shown to be substantially L-shaped, the shapes may vary, but it is advantageous to have the inside surfaces 46 and 50 of the clamp engage edge 36 and surface 52.

In the exemplary but nonlimiting embodiment, four clamps 40 are located at substantially, circumferentially-equally-spaced locations about the stiffener ring (i.e., at substantially 90° intervals). Standard or hydraulic bolts 56, each of which includes a head 58 and a threaded shank 60, extend through the clamps and through a flange of the combustor casing 62. Each bolt is securely fastened by means of a nut 64 threaded on the shank 60 of the bolt, such that the endcover 31 and stiffener ring 38 are clamped between the radial flanges 44 and the combustor casing 62. In the exemplary embodiment, each clamp 40 may have an axial thickness dimension of about six inches, determined to be sufficient to resist any tendency of the endcover 31 to buckle or bend during use. Thus, the clamps 40, along with the stiffener ring 38, are designed such that they can insure an adequate, uniform sealing force when the endcover 31 is attached to the combustor casing 62 using typical Flexitallic™ or similar type gaskets, while minimizing the number of bolted connections required. It will be understood that the number and dimensions of the clamps 40 may vary with specific applications.

In this first exemplary embodiment, each bolt 56 may be hydraulically tensioned and, while tensioned, the nut 64 can be easily applied. After the nut 64 is tightened to specifications, the hydraulic tension force is removed and the cover 31 and stiffener ring 38 are loaded in compression.

Figure 4:
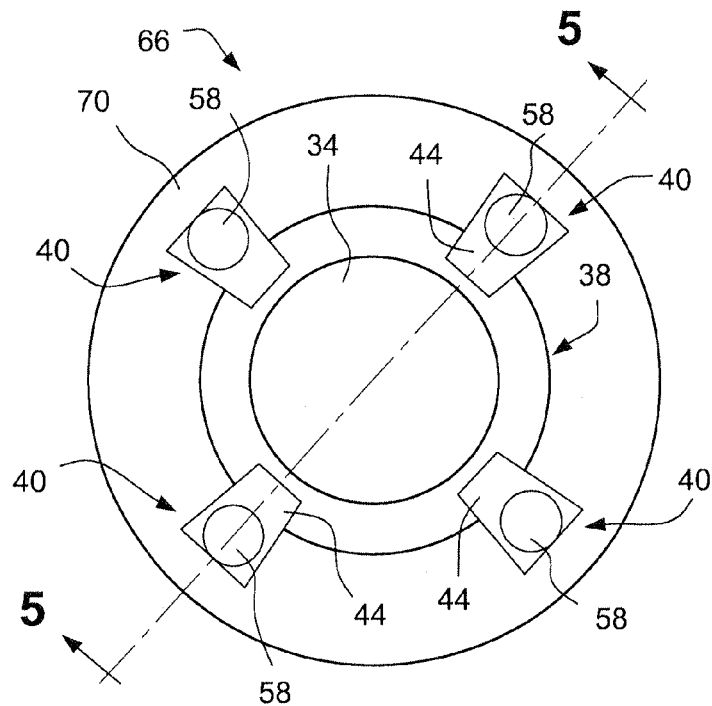
FIG. 4 is an end elevation of a combustor endcover in accordance with a second exemplary but nonlimiting embodiment of the invention.
Figure 5:
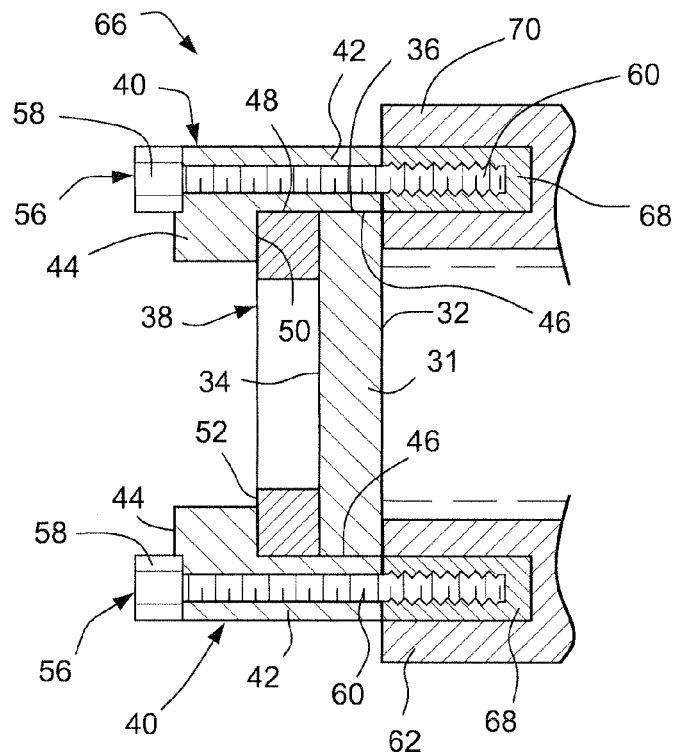
FIG. 5 is a side elevation of the endcover shown in FIG. 4.

With reference now to FIGS. 4 and 5, a second exemplary but nonlimiting embodiment of an endcover assembly 66 is illustrated. This embodiment is substantially identical to the embodiment illustrated in FIGS. 2 and 3 and, accordingly, like-reference numerals are used to designate correspondingly-identical components. In this embodiment, however, the standard or hydraulic bolts 56 are used with conventional helicoil inserts 68 in combination with differently configured casing 70. The helicoil inserts 68 are threaded directly into the casing 70, and the bolts 56 are, in turn, threaded into the inserts.

Figure 6:
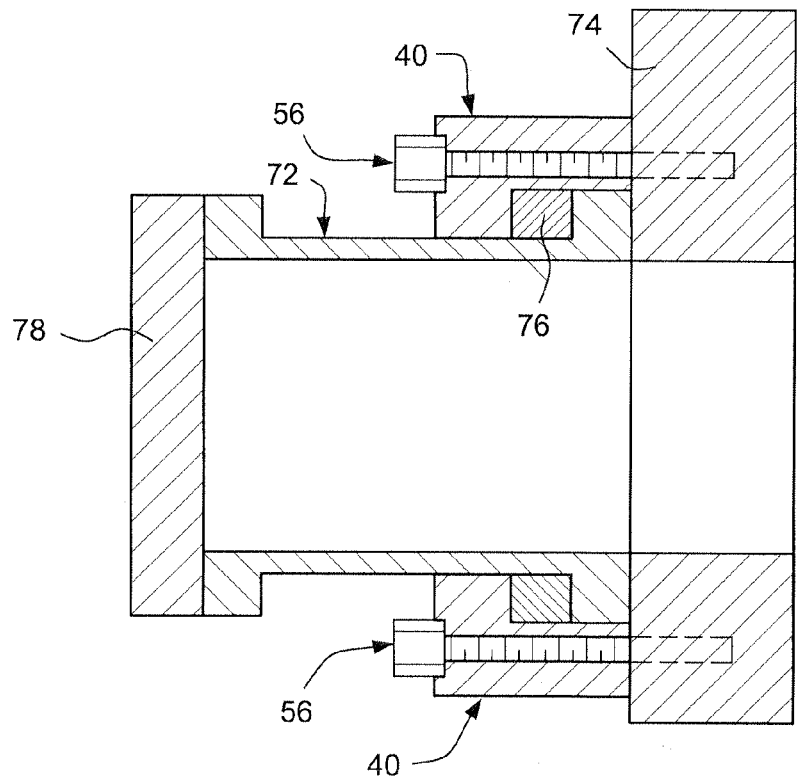
FIG. 6 is an end view of a casing assembly in accordance with a third exemplary but nonlimiting embodiment of the invention.

Referencing FIG. 6, similar clamps 40 and bolts 56 are employed to secure a substantially-cylindrical combustor casing 72 to compressor discharge casing 74 using a similar but re-sized stiffener ring 76, downstream of the combustor endcover 78. The bolts 56 may be used with nuts 64 as shown in FIG. 3 or with helicoil inserts 68 as shown in FIG. 5. The clamp construction, number and spacing of the clamps and the operation of the clamps are as otherwise described above. This arrangement would prove especially useful in combustor arrangements where access to the combustor internals is provided at a location other than the endcover 78 where the entire casing (combined 78 and 72) are removed as a single unit.

Figure 7:
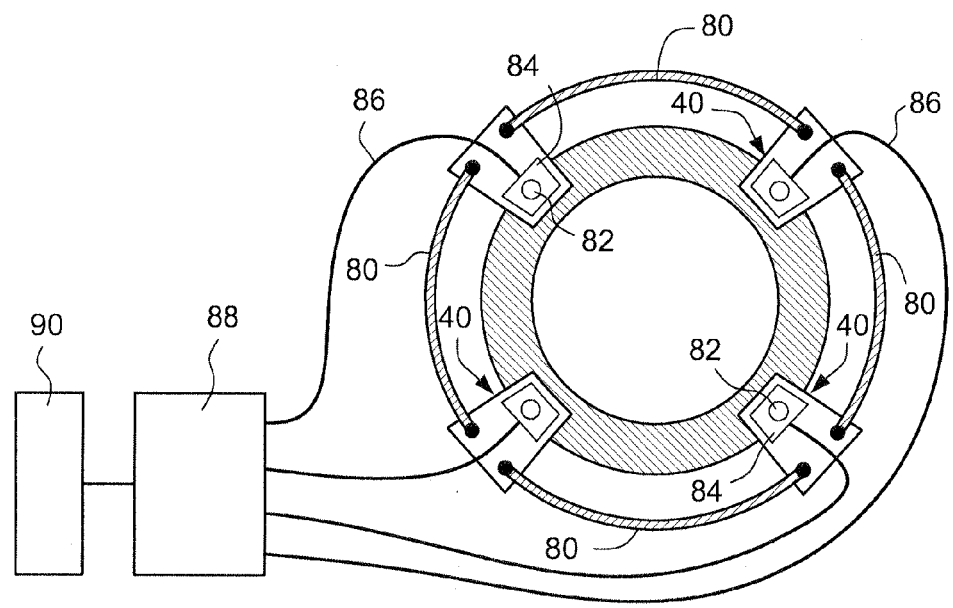
FIG. 7 is a schematic diagram of an arrangement for simultaneously tightening or loosening the casing bolts.

Turning to FIG. 7, the clamps 40 are substantially identical to those used in the embodiments described above, but in this embodiment the circumferentially-spaced clamps are connected by individual, flexible clamp connectors 80 that are able to flex in either of two opposite circumferential directions. The flexible connectors 80 can serve as a guide on which removal/installation tooling (not shown) can glide, facilitating alignment with the bolts 82 of the individual clamps 40. In this regard, additional speed may be achieved by designing tooling for simultaneously removing or installing the bolts 82 from each of the clamps 40. The use of the clamp connectors 80 will also ensure that the technician on site can remove the entire assembly rather than handling four individual sets of clamp components. Furthermore, because the flexible connectors 80 provide two degrees of freedom, if one or more bolts are removed, the flexible connectors 80 are still able to hold the assembly together.

Also shown (schematically) in FIG. 7 are hydraulic fittings 84 located over the bolts 82 and connected via hydraulic lines 86 to a hydraulics distribution box 88 which, in turn, is connected to a control box or panel 90. With all of the clamps 40 connected, the tooling will engage all of the bolts or fasteners 82 simultaneously and apply torque to tighten (or loosen) the bolts. A manifold for the hydraulics to ensure equal pressure distribution and therefore applied force is advantageous and well within the state of the art. Tooling for simultaneously tightening or loosening the bolts is available from, e.g., Nova Machine Products (Hydranut Bolt Tensioning System), and Jetyd Corp., with only normally expected adaptations required to the tooling for use in the context of the endcover assemblies described herein.

In addition to speeding up the assembly/disassembly process, the described tooling also affords a much more uniform sealing arrangement that avoids any distortions or gasket crimping that would occur if the bolts were handled individually.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clamp assembly comprising:
a first component, the first component having an upstream surface;
a second component, the upstream surface of the first component being configured to abut a downstream surface of the second component;
a substantially rigid ring component, an upstream surface of the second component being configured to abut a downstream surface of the substantially rigid ring; and
a plurality of clamp bodies, each having at least two mutually perpendicular inner surfaces arranged about said second component, such that a first inner surface of the at least two mutually perpendicular inner surfaces of a respective one of said plurality of clamp bodies is configured to abut a radially outer surface of the second component and a radially outer surface of the substantially rigid ring, and a second inner surface of the at least two mutually perpendicular inner surfaces of the respective one of said plurality of clamp bodies comprises a flange element projecting from a first end of the respective one of said plurality of clamp bodies, the flange element being configured to be directed radially inward and have an inner flange surface configured to abut an upstream surface of the substantially rigid ring;
at least one fastener adapted to extend through the respective one of said plurality of clamp bodies and into said first component;
wherein the substantially rigid ring has an outer diameter which is substantially equal to an outer diameter of the second component;
the at least one fastener extends through the respective one of said plurality of clamp bodies at a location which is radially outer to the substantially rigid ring and the second component; and
the clamp assembly is configured to facilitate attachment and removal of a second component to and from a first component.

2. The clamp assembly of claim 1 wherein said at least one fastener comprises a bolt.

3. The clamp assembly of claim 2 wherein, during assembly, said bolt is pretensioned.

4. The clamp assembly of claim 1 wherein said plurality of clamp bodies are connected to each other by elongated flexible straps or cables.

5. The clamp assembly of claim 1, wherein said second component comprises a combustor casing.

6. The clamp assembly of claim 1 wherein said at least one fastener is threaded directly into said first component.

7. An assembly comprising:
a combustor casing and an endcover attached to a compressor discharge casing, the endcover abutting the combustor casing and the combustor casing abutting the compressor discharge casing;
a substantially rigid stiffener ring component configured to be arranged upstream from the compressor discharge casing;
a plurality of clamp bodies, each having at least two mutually perpendicular inner surfaces arranged about a portion of the combustor casing such that a first inner surface of the at least two mutually perpendicular inner surfaces of a respective one of said plurality of clamp bodies is configured to abut a radially outer surface of the portion of the combustor casing and a radially outer surface of the substantially rigid stiffener ring, and a second inner surface of the at least two mutually perpendicular inner surfaces of the respective one of said plurality of clamp bodies comprises a flange element projecting from a first end of the respective one of said plurality of clamp bodies, the flange element being configured to be directed radially inward;
the substantially rigid stiffener ring being configured to be arranged between an inner flange surface, the inner flange surface being arranged on the flange element and configured to abut an upstream surface of the substantially rigid stiffener ring, and an upstream surface of said portion of the combustor casing; and
at least one fastener for each of said plurality of clamp bodies adapted to extend through the respective one of said plurality of clamp bodies and into said compressor discharge casing;
wherein the substantially rigid stiffener ring has an outer diameter which is substantially equal to the outer diameter of the portion of the combustor casing;
the at least one fastener extends through the respective one of said clamp bodies at a location which is radially outer of the substantially rigid stiffener ring and the portion of the combustor casing; and
the assembly is configured to facilitate attachment and removal of the endcover to the compressor discharge casing.

8. The assembly of claim 7 wherein said at least one fastener comprises a bolt.

9. The assembly of claim 7 wherein, during assembly, said bolt is pretensioned.

10. The assembly of claim 7 wherein said plurality of clamp bodies are connected to each other by elongated flexible straps or cables.

11. The assembly of claim 7 wherein each of the plurality of clamp bodies is substantially L-shaped.

12. The assembly of claim 7 wherein said at least one fastener is threaded directly into said compressor discharge casing.

13. The assembly of claim 7 wherein said at least one fastener comprises a bolt threaded into an insert secured within said compressor discharge casing.

14. The combustor casing assembly of claim 11 wherein each of the plurality of clamp bodies is formed with an axial section and a radial flange, said axial section engaged with peripheral edges of said combustor casing and said substantially rigid stiffener ring.

15. The combustor casing assembly of claim 14 wherein said radial flange is engaged with an upstream surface of said substantially rigid stiffener ring.

16. A combustor casing assembly comprising:
a combustor casing and an endcover attached to a forward end of a compressor discharge casing, the endcover abutting the combustor casing and the combustor casing abutting the compressor discharge casing;
a substantially rigid stiffener ring component configured to be arranged upstream from the compressor discharge casing;
a plurality of clamp bodies, each having at least two mutually perpendicular inner surfaces arranged about the combustor casing;
a first inner surface of the two mutually perpendicular inner surfaces of a respective one of said plurality of clamp bodies being configured to abut a radially outer surface of a portion of the combustor casing and a radially outer surface of the substantially rigid stiffener ring;
a second inner surface of the at least two mutually perpendicular inner surfaces of the respective one of said plurality of clamp bodies, the second inner surface comprising a flange element projecting from a first end of the respective one of said plurality of clamp bodies,
the substantially rigid stiffener ring being configured to be located between an inner flange surface, the inner flange surface being arranged on the flange element and configured to abut an upstream surface of the substantially rigid stiffener ring, and an upstream surface of said portion of the combustor casing;
at least one fastener for each of said plurality of clamp bodies adapted to extend through the respective one of said plurality of clamp bodies and into said compressor discharge casing; and
tooling for simultaneously tightening or loosening at least one fastener of each of said plurality of clamp bodies;
wherein:
the substantially rigid stiffener ring has an outer diameter which is substantially equal to the outer diameter of the portion of the combustor casing;
the at least one fastener extends through the respective one of said plurality of clamp bodies at a location which is radially outer to the substantially rigid stiffener ring and the portion of the combustor casing; and
the combustor casing assembly is configured to facilitate attachment and removal of the combustor casing to and from the forward end of the compressor discharge casing.

17. The clamp assembly of claim 16, wherein said at least one fastener comprises a bolt.

18. The clamp assembly of claim 17, wherein, during assembly, said bolt is pretensioned.

19. The combustor casing assembly of claim 17, wherein each of the plurality of clamp bodies is substantially L-shaped.

20. The combustor casing assembly of claim 19, wherein each of the plurality of clamp bodies is formed with an axial section and a radial flange, said axial section engaged with peripheral edges of said combustor casing and said substantially rigid stiffener ring, and said radial flange engaged with an upstream surface of said substantially rigid stiffener ring.

* * * * *